United States Patent Office 3,210,343
Patented Oct. 5, 1965

3,210,343
6,19 - LACTONES OF 4,5-DEHYDRO-10-CARBOXY-6β-HYDROXY-3-OXO STEROIDS AND PROCESS FOR THE PREPARATION THEREOF
Derek Harold Richard Barton, Cambridge, Mass., assignor to Research Institute for Medicine and Chemistry, Cambridge, Mass., a corporation of Massachusetts
No Drawing. Filed Dec. 3, 1962, Ser. No. 241,479
Claims priority, application Great Britain, Dec. 5, 1961, 43,518/61
16 Claims. (Cl. 260—239.57)

This invention is concerned with the production of 19-nor-3-oxo-4,5-dehydro steroids and novel intermediates of use in such production.

19-nor-3-oxo-4,5-dehydro steroids have in recent years become of interest in pharmacology. Thus, for example, the compound 17α - ethinyl - 17β - hydroxy-19-nor-Δ⁴-androsten-3-one has proved of especial use in oral contraception and other 19-nor-steroids have been shown to possess useful anabolic, anti-fertility and progestational action. Previous methods of synthesising such compounds have, however been difficult to carry out in practice. It has now been found that these 19-nor-steroids can conveniently be prepared by reduction of the lactones of the corresponding 19-carboxy-6β-hydroxy-steroids with metal or metal ion reducing systems, that is with reducing systems in which a metal is dissolving in an aqueous or acid medium or in which metal ions in a low valency state are converted to a higher valency state. In this process the bonds linking the 10-position and 6-position carbon atoms to the lactone oxycarbonyl group are broken so that no substituents remain at these carbon atoms.

According to the present invention therefore there is provided a process for the production of 4,5-dehydro-3-oxo-19-nor-steroids in which the lactone of a 4,5-dehydro-10-carboxy - 6β - hydroxy - 3 - oxo - steroid is reduced with a reducing system selected from the group consisting of dissolving metal and low-valency metal ion reducing systems, whereby the substitution at the 6- and 10-positions is removed.

The reducing system may, for example, be zinc in the presence of acid, for example, a mineral acid such as aqueous hydrochloric, hydrobromic, sulphuric acid, etc., or, preferably, an organic acid such as glacial or aqueous alkanoic acid, e.g., acetic acid or propionic acid. The zinc is preferably in dust form but may also be in the form of a copper zinc couple. Other reducing metals include, for example, tin, aluminium, amalgam, etc. The reducing agent may also comprise a compound furnishing metal ions in a low valency state which are capable of being easily oxidised to a higher valency state, for example, titanous, chromous or stannous salts, e.g., the chlorides.

The reduction may be effected in a solvent medium, metal ion reducing agents being more effective in aqueous media. Where zinc dust and glacial alkanoic acid are used, the acid may also serve as reaction medium.

The steroid lactone starting material will in general carry substituents at other positions in the molecule, for example a keto group at the 11- and/or 17-position, a methyl group at the 6- or 16-positions, a halogen atom at the 9-position, for example, a fluorine atom, a hydroxy group, acetyl or 1,5-dimethyl hexyl group at the 17-position, etc. A keto group of the 17-position is preferred since the resulting 19-nor steroid may then be converted into, for example, a 17α-ethinyl-17β-hydroxy compound such as the 17α-ethinyl-17β-hydroxy-19-nor-Δ⁴-androsten-3-one referred to above.

The lactone starting material may be prepared, for example, from a corresponding 19-carboxy-6β-hydroxy-3-oxo-steroid lactone which carries a 5α-substituent capable of undergoing β-elimination. The following reaction diagram indicates the configuration of the A and B rings of the steroid molecules concerned and various stages in the synthesis of these compounds by a preferred sequence of reactions.

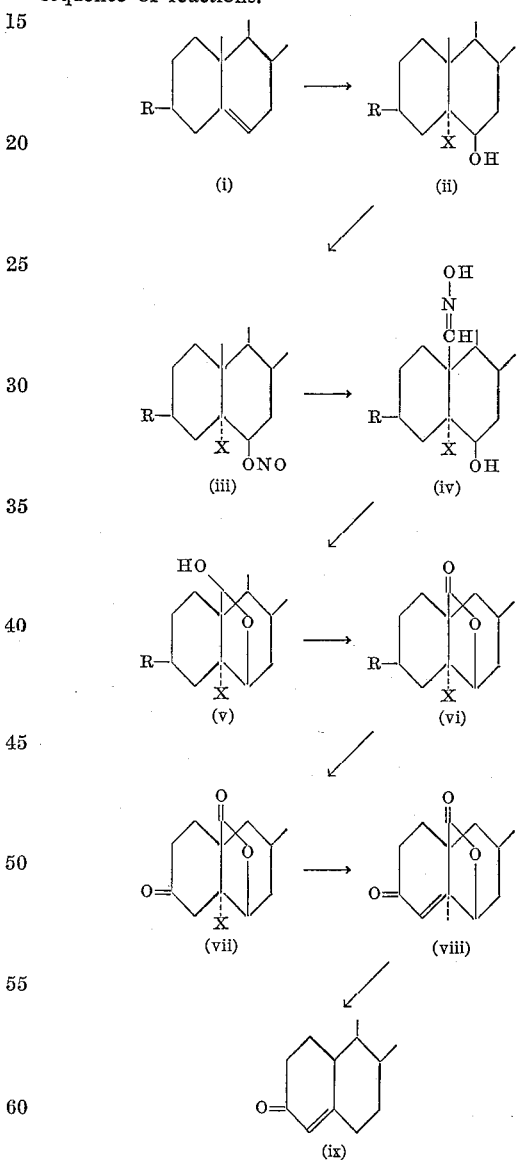

In the above reaction diagram, X represents a β-eliminatable substituent, for example, a halogen atom, such as a fluorine, chlorine, bromine or iodine atom or a hydroxyl or sulphonyloxy group, e.g., a methansulphonyloxy or toluensulphonyloxy group, etc. R represents a group which may be converted into a keto group, for example, an acyloxy group which can be hydrolysed to hydroxyl and the latter oxidised to a keto group, or a protected keto group such as a ketal or thioketal group.

In converting compounds having structure (vii) into compounds of structure (viii) the presence of the oxo-group in the 3-position directs the double-bond so formed into the 4,5-position. Where the substituent to be eliminated (together with a hydrogen atom at the 4-position) is a halogen atom or sulphonyloxy group, the elimination is preferably acid catalysed, for example, by mineral acid such as a hydrohalic acid, e.g., hydrogen chloride in methanol or acetic acid. Where the 5α-substitutent is a hydroxy group, elimination is preferably effected in the presence of a dehydrating agent such as phosphorus oxychloride, etc., or by heating.

Where the 5α-substituent is easily eilminated in the presence of acid, it is often possible to omit elimination as a separate step and to react the 5α-substituted lactone having the structure (vii) directly with a metal or metal ion reducing system in the presence of acid. Thus, where a 5α-bromo-lactone is used, treatment with zinc and acetic acid effects simultaneous reduction and elimination.

The 5α-substituted 3-oxo-lactone having the partial structure (vii) may be prepared from a corresponding 5α-substituted 19-carboxy-6β-hydroxy steroid lactone having the partial structure (vi). As indicated above, the group R at the 3-position is a group convertible to a keto group, for example, an acyloxy group or a protected ketone group such as a ketal or thioketal group.

Where the group R is an acyloxy group, e.g., an acetoxy, propionyloxy, benzoyloxy group, etc., this may be hydrolysed to give a hydroxyl group, for example, with a mineral acid, e.g., a hydrogen halide such as hydrogen chloride etc. or sulphuric acid, or with alkali, e.g., an alkali metal hydroxide, alkoxide, etc., preferably in an aqueous organic solvent medium, e.g., aqueous dioxan, and the hydroxy group may then be oxidised to give a keto group. This oxidation may be effected, for example, by reagents suitable for oxidising secondary alcohols to keto groups. Chromium trioxide is preferred, advantageously in the presence of acetic acid, pyridine, or preferably, acetone (Jones oxidation). It is generally found, however, that the oxidation conditions may lead to simultaneous elimination of the 5α-substituent to give a mixture of saturated and unsaturated 3-oxo-steroids. Such a mixture may then be treated separately to eliminate the 5α-substituent or may often be subjected to the final reduction step directly.

The removal of the protecting group from the protected 3-oxo-steroid, for example, a 3-ketal or 3-thio ketal of the desired compound, may be effected by hydrolysis, for example, with a mineral acid, e.g., hydrochloric acid, sulphuric acid etc.

The 5-substituted 19-carboxy-6-hydroxy steroid lactone having the partial structure (vi) may be prepared by oxidation of the corresponding 5-substituted 6,19-hemiacetal, having the partial structure (v), for example by chromium trioxide oxidising agents such as Jones' reagent (chromium trioxide in acetone). The hemiacetal may conveniently be prepared from the corresponding 5-substituted 6-hydroxy-steroid oxime having the partial structure (iv) by cleavage to the aldehyde which then forms the desired hemiacetal with the 6-position hydroxyl group. The cleavage of the oxime may be effected by aqueous acid, e.g., mineral acid such as hydrochloric, sulphuric acid, etc., or, advantageously, by nitrous acid, for example, by reaction with a nitrite in the presence of acid.

The oxime of partial structure (iv) may be prepared, for example, by photolysis of a nitrite ester having the partial structure (iii). The nitrite ester may be irradiated with ultra-violet light at a wavelength corresponding to the absorption maximum of the nitrite radical, i.e., between about 3000 and 4400 A. preferably between 3400 and 4000 A. The irradiation of the desired wavelength may be supplied by a high pressure mercury arc lamp. The irradiation is preferably effected in dilute solution, conveniently in a solvent having low absorption at the wavelengths used, e.g., hydrocarbons such as benzene, toluene, chlorinated hydrocarbons, e.g., carbon tetrachloride, chloroform, etc. The initial photolysis product is a nitroso derivative which is normally dimeric but this may be readily isomerised to give the desired oxime under prototropic conditions, e.g., by heating in an inert solvent.

The nitrite ester having the partial structure (iii) may be prepared, for example, by reacting a 6-hydroxy steroid having the partial structure (ii) with a nitrosylating agent such as a nitrosyl halide, e.g., nitrosyl chloride. Nitrosyl halides are preferably reacted with a solution of the 6-hydroxy steroid containing a base as hydrogen halide acceptor, e.g., an organic base such as pyridine, N-methyl piperidine, triethylamine etc.

The 6-hydroxy steroid of partial structure (ii) where X is halogen may be obtained, for example, by reaction of a 5,6-dehydro-steroid having the partial structure (i) with a hypohalous acid. Thus, the preferred compounds having the partial structure (ii) where X is bromine may be obtained by reacting the 5,6-dehydro steroid with hypobromous acid. The hypobromous acid may, for example, be generated in situ using an N-bromoamide or imide such as N-bromoacetamide and acid, e.g., mineral acid such as hydrochloric or sulphuric acid or, preferably, perchloric acid. Where X is a hydroxyl or acyloxy group, the desired intermediate of partial structure (ii) may be obtained from the corresponding 5,6-epoxide by reaction with water or an appropriate acid.

It will thus be seen that the reactions described above allow useful 19-nor-steroids to be prepared from such known compounds as the 3-substituted 5,6-dehydro steroids of partial structure (i) and the present invention includes the preparation of 19-nor steroids having the partial structure (ix) starting from 5,6-dehydro-steroids of partial structure (i) or from any of the intermediates having the partial structures (ii) to (viii). Steroids having the partial structures (ii) to (viii) have not previously been reported and constitute a further feature of the invention.

The activity of the 19-nor-3-oxo-4,5-dehydro steroids varies largely with the nature of the groups at the 17-position. Thus, for example, 17β-ethinyl, 17β-hydroxy 19-nor-$\Delta^4$-androsten-3-one is a useful oral contraceptive while 19-nor testosterone and its 17-acetate are useful anabolic agents; 19-nor progesterone and 19-nor-17-acetoxy progesterone are useful progestational agents.

It should be noted that the intermediates of partial structure (ii) are also of use in the synthesis of 19-hydroxy steroids.

The physiological activity of the 19-hydroxy steroids is found to vary with the substitution at the C–17 position and in general they have similar activity to the corresponding 19-nor compound. Especially useful compounds are 19-hydroxy testosterone and its 17-acetate which exert an anabolic action, 19-hydroxy progesterone and 19-hydroxy-17-acetoxy-progesterone which exert a progestational action and 19-hydroxy cholesterol which has a blood-cholesterol lowering effect. All these compounds are new and constitute a further feature of the invention.

Oxidation of the compound of skeletal structure (ii) to form a 6,19-oxide bridge, for example using lead tetraacetate, HgO and iodine, etc., yields besides oxidation products, a cyclic 6,19-ether having the partial structure

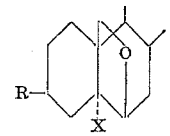

(x)

where X and R have the above meanings. After isolation, e.g., by chromatography, this ether may be subjected to hydrolysis, preferably using basic conditions for example an alkali metal hydroxide, advantageously in alkanolic solution, e.g., methanolic KOH. Where R is an acyloxy group, hydrolysis yields a 3-hydroxy steroid ((x), R=OH) which may be subjected to oxidation to convert the 3-hydroxyl group into a keto group. Oxidation may be effected, for example, by Oppenauer reagents, e.g., a ketone such as acetone or acetophenone and a metal t-butoxide, e.g., alkali metal or aluminium t-butoxide, or by chromium trioxide oxidation preferably using acetone as reaction medium. The resulting 3-ketosteroid ((x), R=O=) then eliminates hydrogen halide to yield a conjugated 3-keto-4,5-dehydrosteroid. Elimination generally occurs spontaneously during oxidation but may be effected by acid catalysis. The resulting steroid having the partial structure

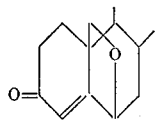

may then be reduced by a metal or metal ion reducing agent of the kind described for the reduction of the 6.19-lactones (viii) to reductively cleave the carbon-oxygen bond at the 6-position yielding a 19-hydroxy steroid having the partial structure

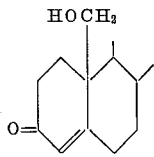

It is also possible to avoid completing the elimination before reduction where the reduction conditions are acid, e.g., when using zinc and acetic acid, the preferred reducing system.

The oxidation of the 6β-hydroxy-steroid to form a 6,19-oxide is advantageously effected with a reagent system generating positive chlorine, bromine or iodine ions; substances generating I+ ions are especially preferred. Thus, for example, heavy metal oxides such as mercuric, silver or plumbic oxide in the presence of $I_2$ are especially effective in closing the oxide ring and acylates of lead or metals of the 1st and 2nd sub-groups of the periodic table are also effective in the presence of $I_2$, for example, acetates, propionates, benzoates, e.g., silver or mercury acetate, lead tetra-acetate, etc. Other substances which may be used to close the 6,19-oxide ring include cyanogen chloride, bromide and iodide and interhalogen compounds such as iodine monochloride or iodine monobromide.

In order that the invention may be well understood we give the following examples by way of illustration only. All temperatures are in degrees centigrade.

*Example 1.—5α-bromo-3β-acetoxy-cholestan-6β-ol*

A solution of cholesteryl acetate (50 g.) in purified dioxan (400 cc.) and aqueous perchloric acid (23 cc., 0.5 N) was vigorously stirred in a dark flask at room temperature. N-bromoacetamide (43.2 g.) was then added to it in four portions during a period of 30 minutes. Stirring was continued for 30 minutes after the last addition. The reaction mixture, after being cooled in ice-water, was diluted with water (200 cc.) and then decomposed with 10% aqueous sodium sulphite (300 cc.). The product was extracted with ether and the organic layer was washed with water, dried ($Na_2SO_4$) and evaporated. Crystallization from methylene chloride-hexane gave 5α-bromo-3β-acetoxy-cholestan-6β-ol (344 g.; 61%), M.P. 172–174°

$\nu_{max}^{KBr}$ 3600 ms., 1725 s. cm.$^{-1}$

*Example 2.—5α-bromo-3β-acetoxy-androstan-6β-ol-17-one*

A solution of 3β-acetoxy-androsten-17-one (20 g.) in purified dioxan (160 cc.) and aqueous perchloric acid (9.2 cc., 0.5 N) was treated with N-bromoacetamide (17.3 g.) as described in the preceding experiment. After being extracted with methylene chloride, the product was worked up as usual. Crystallization from hexane yielded 5α-bromo - 3β - acetoxy - androstan - 6β-ol-17-one (19.2 g., 74.7%). An analytical sample was crystallized from methanol and had M.P. 171–172°, $[\alpha]_D^{26}$ +1.9° ($CHCl_3$, c.=1.19)

$\nu_{max}^{KBr}$ 3650 ms., 1740 s. cm.$^{-1}$ (Found: C, 58.65; H, 7.45; O, 15.00; Br, 19.05. $C_{21}H_{31}O_4Br$ requires: C, 59.00; H, 7.30; O, 14.95; Br, 18.75%.)

*Example 3.—5α-bromo-3β,17β-diacetoxy-androstan-6β-ol*

A solution of 3β,17β-diacetoxy-androstene (30 g.) in purified dioxan (240 cc.) and aqueous perchloric acid (13.8 cc., 0.5 N) was treated with N-bromoacetamide (25.92 g.) as described in the preceding experiment. After being extracted with methylene chloride, the product was worked up as usual. Crystallization from acetone-hexane gave 5α-bromo-3β,17β-diacetoxy-androstan-6β-ol (21 g., 56%), M.P. 168–172°. Recrystallization from methylene chloride-hexane gave M.P. 170–172.5°, $[\alpha]_D^{27°}$ −49° ($CHCl_3$, c.=1.09). (Found: C, 58.50; H, 7.25; Br, 16.25. $C_{23}H_{35}O_5Br$ requires: C, 58.60; H, 7.50; Br, 16.95%.)

*Example 4.—5α-bromo-3β-acetoxy-cholestan-6β-yl nitrite*

A solution of 5α-bromo-3β-acetoxy-cholestan-6β-ol (25 g.) in dry pyridine (300 cc.; Karl Fischer reagent) was treated with nitrosyl chloride at −20° until a blue colour appeared. The reaction mixture was decomposed by a slow addition of ice-water (500 cc.) and the resulting precipitate was filtered and washed with water. The product was then taken in a minimum amount of methylene chloride, dried ($Na_2SO_4$) and crystallised by the addition of methanol to yield 5α-bromo-3β-acetoxy-cholestan-6β-yl nitrite (22.4 g.; 90%), M.P. 110–112°, $[\alpha]_D^{24}$ −70° ($CHCl_3$, c=0.965)

$\nu_{max}^{KBr}$ 1750 s., 1660 va. cm.$^{-1}$ (Found: C, 62.45; H, 8.40; N, 2.55; Br, 14.60.

$C_{29}H_{48}O_4BrN$ requires: C, 62.80; H, 8.70; N, 2.55, Br, 14.40%.)

*Example 5.—Photolysis of 5α-bromo-3β-acetoxy-cholestan-6α-yl nitrite*

A solution of the above nitrite in toluene (700 cc.) was irradiated in a standard apparatus with a 200 watt high pressure mercury lamp at 0°. After three hours the nitroso dimer was filtered off, washed with hexane, taken in isopropanol (300 cc.) and heated on a steam bath for two minutes beyond the disappearance of the green colour. Removal of the solvent in vacuo and crystallisation of the residue from methanol gave 5α-bromo-3β-acetoxy-19-oximino-cholestan-6β-ol (16 g., 55%), M.P. 176–180°, $[\alpha]_D^{21}$ −35° ($CHCl_3$, c.=0.864). (Found: C, 62.75; H, 8.75; N, 2.45; Br, 14.30. $C_{29}H_{48}O_4BrN$ requires: C, 62.80; H, 8.10; N, 2.50; Br, 14.40%.)

*Example 6.—5α-bromo-3β,17β-diacetoxy-androstan-6β-yl nitrite*

A solution of 5α-bromo-3β,17β-diacetoxy-androstan-6β-ol (9.83 g.) in pyridine (200 cc.) was treated with gaseous nitrosyl chloride at −10° until a blue colour appeared. The reaction mixture was then decomposed with cold water and the resulting oily mixture chilled until it turned into a solid. The solid was filtered, washed free of pyridine, dissolved in ether, filtered through sodium sulphate and evaporated to dryness under vacuum.

Crystallisation from hexane yielded 5α-bromo-3β,17β-diacetoxy-androstan-6β-yl nitrite (9.5 g.; 92%), M.P. 80–83°, which decomposed on recrystallisation.

*Example 7.—Photolysis of 5α-bromo-3β,17β-diacetoxy-androstan-6-yl nitrite*

The above nitrite (2.4 g.) in toluene (200 cc.) was irradiated at room temperature as described previously. After 45 minutes, the nitroso dimer (0.86 g.; 36%) was filtered and washed with hexane. The nitroso dimer (0.86 g.) was dissolved in isopropanol (50 cc.) and refluxed for 40 minutes. The solvent was then removed in vacuo and the residue crystallised from ethyl acetate to yield 5α - bromo - 3β,17β-diacetoxy-19-oximino-androstan-6β-ol (480 mg.; 56%). An analytical sample crystallised from ethyl acetate-hexane had M.P. 175.5–176°, $[\alpha]_D$ —61° (c. 0.534 in $CHCl_3$)

$\nu_{max.}^{KBr}$ 360 ms., 1745 s. 1720 s. cm.$^{-1}$ (Found: C, 54.90; H, 6.90; N, 2.75; Br, 16.20.

$C_{23}H_{34}O_6NBr$ requires: C, 55.20; H, 6.85; N, 2.80; Br, 15.96%.)

*Example 8.—Preparation and photolysis of 5α-bromo-3β-acetoxy-androstan-17-one-6β-yl nitrite*

A solution of 5α-bromo-3β-acetoxy-androstan-6β-ol-17-one (20 g.) in pyridine (400 cc.) was treated with nitrosyl chloride at —30° until a blue colour appeared. The reaction mixture was decomposed by a slow addition of cold water and the resulting crystalline precipitate filtered and washed several times with water to remove the last traces of pyridine. The crystalline precipitate was dissolved in toluene (600 cc.), filtered through sodium sulphate and irradiated at 0° using a 500 watt high pressure mercury lamp. After one hour, the insoluble nitroso dimer (8.65 g.) was filtered off.

The preceding nitroso dimer (8.65 g.) in isopropanol (200 cc.) was heated on the steam bath for two minutes beyond the disappearance of the green colour. Evaporation of the solvent under vacuum and crystallisation from acetone/hexane gave 5α-bromo - 3β-acetoxy-19-oximino-androstan-6β-ol-17-one (7.65 g.). An analytical sample crystallised from acetone-hexane had M.P. 178.5–180°, $[\alpha]_D^{26}$ —11° (dioxan, c.=0.445)

$\nu_{max.}^{KBr}$ 340 vs. (broad), 1750 vs., 1700 (shoulder) cm.$^{-1}$ (Found: C, 55.15; H, 6.65; O, 17.45; N, 3.00. $C_{21}H_{30}O_5N$ requires: C, 55.25; H, 5.65; O, 17.55, N, 3.05%.)

*Example 9.—5α-bromo-3β-acetoxy-6β-hydroxy-cholestan-19-oic lactone*

A solution of the oxime prepared in Example 5 (5 g.) in glacial acetic acid (850 cc.) and water (170 cc.) at 70° was treated with sodium nitrite (5 g.). After 2 minutes the reaction mixture was poured into ice+$H_2O$ and extracted several times with methylene chloride. The organic layer was worked up as usual. The residue, without any further purification, was used for oxidation.

The preceding oil (ca. 5 g.) in acetone (250 cc.) was treated with an excess of Jones' reagent at room temperature for 3 minutes, then with methanol and water. The product was extracted with ether and worked up as usual. The residue was chromatographed on alumina (250 g.) and fractions were eluted with hexane containing increasing amounts of benzene. The less polar fractions on crystallisation from methanol gave 5α-bromo-3β-acetoxy-6β-hydroxy-cholestan - 19 - oic lactone (1.9 g.; 32%), M.P. 170–172°, $[\alpha]_D^{25}$ —16.2° ($CHCl_3$, c.=1.05)

$\nu_{max.}^{KBr}$ 1775 vs., 1735 cm.$^{-1}$ (Found: C, 64.95; H, 8.35; Br, 14.75. $C_{29}H_{45}O_4Br$ requires: C, 64.80; H, 8.45; Br, 14.75%.) While the later fractions on crystallisation from methanol gave 5α-bromo-3β-acetoxy-19-oxo-cholestane, 6,19 hemiacetal acetate (900 mg., 16%), M.P. 139–142°, recrystallisation from aqueous acetic acid gave the pure diacetate, M.P. 151–156°, $[\alpha]_D^{21}$+20.6° ($CHCl_3$, c.=1.1).

$\nu_{max.}^{KBr}$ 1740 vs., cm.$^{-1}$ (Found: C, 64.25; H, 8.50; O, 13.85; Br, 13.90.

$C_{31}H_{49}O_5Br$ requires: C, 64.00; H, 8.50; O, 13.75; Br, 13.75%.)

*Example 10.—5α-bromo-3β-acetoxy-6β-hydroxy-19-oxo-androstan-17-one 6,19 hemiacetal*

A solution of the oxime prepared in Example 8 (2 g.) in acetic acid (100 cc.) and water (20 c.) was treated with sodium nitrite (2 g.) at 70° for 3 minutes. The reaction mixture was cooled, diluted with aqueous sodium chloride, extracted several times with methylene chloride and worked up as usual. Chromatography of the residue on alumina (60 g.), and elution of fractions with hexane containing increasing amounts of benzene gave, after crystallisation of the solid fraction from methylene chloride/hexane, 5α-bromo - 3β-acetoxy - 6β-hydroxy-19-oxo-androstan-17-one 6,19 hemiacetal (270 mg.). Recrystallisation from ether/petroleum ether gave plates m.p. 184–186°, $[\alpha]_D^{27.5°}$+41° ($CHCl_3$, c.=1.04).

$\nu_{max.}^{KBr}$ 3600 s., 1740 vs., 1700 vs. cm.$^{-1}$ (Found: C, 56.85; H, 6.45; O, 17.75; Br, 18.10. $C_{21}H_{29}O_5Br$ requires: C, 57.15; H, 6.60; O, 18.10; Br, 18.10%.)

*Example 11.—5α-bromo-3β-acetoxy-6β-hydroxy-androstan-19-oic lactone*

A solution of the oxime prepared in Example 8 (9.3 g.) in acetic acid (500 cc.) and water (100 cc.) was treated with sodium nitrite (9.3 g.) as described in the previous experiment. The crude hemiacetal in acetone (200 cc.) was treated with an excess of Jones' reagent at room temperature for 3 minutes, then with methanol and water. The product was extracted with ether and worked up as usual. Crystallisation of the residue from methylene chloride/hexane gave 5α-bromo-3β-acetoxy-6β-hydroxy-androstan-19-oic lactone (2.35 g.). Chromatography of the mother liquors on alumina (80 g.) and elution of fractions with hexane containing increasing amounts of benzene gave, after crystallisation of the less polar fractions, the desired lactone (2.9 g.) (total yield 59%). The more polar fractions after crystallisation yielded the hemiacetal diacetate (ca. 1.2 g.) which could not be obtained analytically pure. The desired lactone, on recrystallisation from methylene chloride-hexane, had M.P. 221–229°, $[\alpha]_D^{27}$—13° ($CHCl_3$, c.=1.03)

$\nu_{max.}^{KBr}$ 1780 vs., 1750 vs., 1240 vs. cm.$^{-1}$ (Found: C, 57.10; H, 6.05; Br, 18.05. $C_{21}H_{27}O_5Br$ requires: C, 57.40; H, 6.20; Br, 18.20%.)

*Example 12.—5α-bromo-3β-6β-dihydroxy-cholestan-19-oic lactone*

A solution of the acetoxy lactone prepared in Example 9 (120 mg.) in dioxan (10 cc.) was treated under nitrogen with water (5 cc.) and concentrated hydrochloric acid (1 cc.). After standing overnight at room temperature, the reaction mixture was heated on a steam bath for 2 hours, cooled, diluted with water, extracted with ether and worked up as usual. Crystallisation from acetone/hexane gave 5α-bromo-3β,6β-dihydroxy-cholestan-19-oic lactone (80 mg., 73%) M.P. 173.5–178.5°, $[\alpha]_D^{25}$—17.9° ($CHI_3$, c.=0.89).

$\nu_{max.}^{KBr}$ 3450 ms., 1780 vs. cm.$^{-1}$ (Found: C, 65.50; H, 8.85; O, 9.75; Br, 16.45. $C_{27}H_{42}O_3Br$ requires: C, 65.45; H, 8.75; O, 9.70; Br, 16.15%.)

*Example 13.—5α-bromo-3β,6β-dihydroxy-androstan-17-on-19-oic lactone*

A solution of the acetoxy-lactone prepared in Example 11 (1.4 g.) in dioxan (48 cc.) was treated under nitrogen with water (48 cc.) and HCl (9.6 cc.); after being heated on a steam bath for 1¾ hours, the reaction mixture was cooled, diluted with water, extracted with methylene chloride and worked up as usual. Crystallisation from methylene chloride-hexane gave 5α-bromo-3β,6β-hydroxy-androstan-17-on-19-oic lactone (630 mg., 52%) M.P. 221–232°, $[\alpha]_D^{25.5}+10°$ (CHCl$_3$, c.=1.06)

$\nu_{max.}^{KBr}$ 3500 s., 1775 vs., 1725 vs. (broad) cm$^{-1}$ (Found: C, 57.65; H, 6.50; O, 16.20; Br, 19.85. C$_{19}$H$_{25}$O$_4$Br requires: C, 57.45; H, 6.35; O, 16.10; Br, 20.10%.)

*Example 14.—5α-bromo - 6β-hydroxy-cholestan-3-on-19-oic lactone and Δ$^4$-6β-hydroxy-cholestan-3-on-19-oic lactone*

A solution of the hydroxy lactone, prepared in Example 12 by hydrolysis of the acetoxy lactone, (340 mg.), in acetone (25 cc.) was treated with an excess of Jones' reagent, then with methanol and water. The reaction mixture was extracted with ether and worked up as usual. Crystallisation from methanol gave the bromo ketone (175 mg.) M.P. 176–181°, $[\alpha]_D^{26}+19.4$ (CHCl$_3$, c.=0.875).

$\nu_{max.}^{KBr}$ 1775 vs., 1730 ms. cm.$^{-1}$ (The ketone decomposes on attempted recrystallisation.)
A solution of preceding bromo ketone (100 mg.) in acetic acid (10 cc.) containing a drop of hydrochloric acid was heated on a steam bath for 10 minutes and then worked up to yield Δ$^4$-6β-hydroxy-cholestan-3-on-19-oic lactone M.P. 179–184°, $[\alpha]_D^{26}+102°$ (CHCl$_3$, c.=0.976), $\lambda_{max.}^{MeOH}$ 238 mμ (s.=12,500) $\nu_{max.}^{CHCl_3}$ 1775 vs., 1660 vs. cm.$^{-1}$ (Found: C, 78.00; H, 9.70; O, 12.05. C$_{27}$H$_{40}$O$_3$ requires: C, 78.6; H, 9.75; O, 11.65%.)

*Example 15.—19-nor-cholestenone*

A solution of crude ketone (prepared as in Example 14 from 700 mg. of acetoxy-lactone by hydrolysis and subsequent oxidation) in glacial acetic acid was boiled with gentle stirring, and treated with zinc dust (5.6 g.) in two portions for 15 minutes. Zinc was removed by filtration, acetic acid was evaporated under vacuum, product was taken in ether, washed with water, dried (Na$_2$SO$_4$) and evaporated. The residue was taken in chloroform (50 cc.) and methanolic hydrochloric acid (12 cc.; 1.2 N) and the mixture refluxed for 15 minutes. After being diluted with water, the reaction mixture was worked up as usual. The residue was chromatographed on alumina (30 g.) and fractions eluted with hexane containing increasing amounts of benzene. The fractions showing only a conjugated ketone band (1660 cm.$^{-1}$) were combined with sublimed (200°/1 mm.) to yield 19-nor-cholestenone (225 mg.; 47% overall yield) $[\alpha]_D^{26}+44.2°$ (CHCl$_3$, c.=1.05)

$\lambda_{max.}^{MeOH}$ 240 (ε=14,000). $\nu_{max.}^{CHCl_3}$ 1665 vs., 1610 w. cm.$^{-1}$ (Found: C, 83.45; H, 11.80; O, 4.60. C$_{26}$H$_{42}$O requires C, 84.25; H, 11.40; O, 4.30%).

*Example 16.—Δ$^4$-6β-hydroxy-androstene-3,17-dione-19-oic lactone*

A solution of the hydroxy lactone prepared in Example 13 (200 mg.) in acetone (20 cc.) was treated with an excess of Jones' reagent (1 cc.) at room temperature for 4 minutes, and then with methanol and water. The reaction mixture was extracted with ether and worked up as usual. The residue was taken in chloroform (20 cc.) and methanolic hydrochloric acid (2 cc.; 0.8 N) and refluxed for 15 minutes. Dilution with water, extraction with methylene chloride followed by crystallisation from methylene chloride-hexane gave Δ$^4$-6β-hydroxy-androstene-3,,17-dione-19-oic lactone (100 mg., 65%). The analytical sample was crystallised from ether-petroleum ether and had M.P. 291–293°, $[\alpha]_D^{26}-86°$ (CHCl$_3$, c.=0.995).

$\lambda_{max.}^{MeOH}$ 235 mμ (ε=12,000)

(Found: C, 72.45; H, 7.05; O, 20.50. C$_{18}$H$_{22}$O$_4$ requires: C, 72.60; H, 7.05; O, 20.35%).

*Example 17.—19-nor-Δ$^4$-androstene-3,17-dione*

In subsequent reactions, the isolation of the unsaturated ketone prepared in Example 16 was not deemed necessary. Instead, the hydroxy lactone starting material (290 mg.) was oxidized as previously described to give a mixture of desired conjugated and unconjugated ketones. This was then taken in acetic acid (28 cc.) boiled with gentle stirring, and treated with zinc duct (4.8 g.) in two portions over a period of 15 minutes. The inorganic material was removed by filtration and the acetic acid evaporated under vacuum. The product was extracted with chloroform and worked up as usual. The residue was dissolved in chloroform (10 cc.) and methanolic hydrochloric acid (1 cc.; 0.8 N) and refluxed for 15 minutes. After being worked up as usual, the product was chromatographed on alumina. Crystallisation of the solid fractions from ether-petroleum ether gave 19-nor-Δ4-androstene-3,17-dione (140 mg., 70%) M.P. 164–169°, $[\alpha]_D^{27°}+136°$ (CHCl$_3$, c.=1.01)

$\lambda_{max.}^{MeOH}$ 241 mμ (ε17,000) $\nu_{max.}^{KBr}$ 1740 vs., 1620 s. cm.$^{-1}$ (Found: C, 79.25; H, 8.65; O, 12.25. C$_{18}$H$_{24}$O$_2$ requires: C, 79.35; H, 8.90; O, 11.75%.) Hyiura, Noguchi & Nishihawa (Chem. & Pharm. Bull., 1960, 8, 84) give M.P. 169–171°, $[\alpha]_D+135°$ (CHCl$_3$), $\lambda_{max.}^{EtOH}$ 238 mμ (ε=17,000)

*Example 18.—5α-bromo-3β-acetoxy-androstan-17-one-6,19 ether*

A solution of the bromohydrin prepared in Example 2 (10 g.) in benzene (600 cc.) was treated with lead tetra-acetate (25 g. which had been washed with acetic acid and dried by azeotropic distillation over benzene) and refluxed overnight. After being cooled, the reaction mixture was treated with aqueous potassium iodide (60 g.) in water (1000 cc.) and extracted with ether. The combined organic extract was washed with 10% sodium thiosulphate and water respectively, dried (Na$_2$SO$_3$) and evaporated. Chromatography of the resulting oil on alumina (500 g.) gave, from solid fractions after crystallisation from methanol, the desired 6,19-ether (2.9 g., 29%) M.P. 177–178°, $[\alpha]_D^{25}+35.9°$ (CHCl$_3$, c.=0.715). (Found: C, 58.85; H, 7.20; O, 14.75; Br, 18.75. C$_{21}$H$_{28}$O$_4$Br requires: C, 59.30; H, 6.85; O, 15.05; Br, 18.80%.)

*Example 19.—5α-bromo-3β-17β-diacetoxy-androstan-6,19-ether*

The bromohydrin, 5α-bromo - 3β,17β - diacetoxy-6-hydroxy-androstane (5 g.) was dissolved in anhydrous benzene (250 ml.) and treated with Pb(OAc)$_4$ (~15 g.) (previously washed with acetic acid and dried overnight in a vacuum desiccator containing KOH and CaCl$_2$) and I$_2$ (8.58 g.). The mixture was photolysed for six hours using the 200 watt lamp and with constant stirring at reflux temperature. The mixture was cooled, water was added, and the mixture was extracted with ether. The extract was washed with 10% aq. Na$_2$SO$_3$ solution and water, dried, and evaporated to dryness. Residue crystallised from methanol, yield 3.435 g. (63%), M.P. 173–178° C. Analytical sample (repeat) crystallised from ether-pet. ether, M.P. 179–181° C., $[\alpha]_D^{+15}$ —7° (CHCl$_3$, c.=0.720), IR 6108.

*Analysis*—Calcd. for C$_{23}$H$_{35}$O$_5$Br: C, 58.85; H, 7.09; O, 17.04; Br, 17.02. (M.W. 469.433). Found: C, 58.91; H, 6.69; O, 16.92; Br, 17.03.

*Example 20.—5α-bromo-3β-acetoxy-pregnan-20-one-6,19-ether*

The bromohydrin 5α-bromo-6β - hydroxy - 3β-acetoxy-pregnan-20-one (5 g.) in benzene (250 cc.), Pb(OAc)$_4$ (9.7 g.), and I$_2$ (5.58 g.), as described above, gave the desired ether (2.09 g.), M.P. 154–157° (methanol), $[\alpha]_D^{24}$ +56° (CHCl$_3$, c.=0.629).

*Example 21.—The preparation of 3β,17α-diacetoxy-pregn-5-ene-20-one*

Steroid (50 g.) was treated with HOAc (1500 cc.), Ac$_2$O (450 cc.) and HClO$_4$ [70%] (18 cc.) at 0° C. for two hours. A solid was precipitated with water, filtered, and crystallised from CH$_2$Cl$_2$-hexane. The first two crops gave 48.3 g. (87.2%) of pure diacetate, M.P. 169–175° C. A third crop of impure product, 2.9 g. (5.2%) was obtained.

IR $\nu_{max}^{KBr}$ 1750 vs., 1710 vs. shoulder, 1660 w. 1250 vs. cm.$^{-1}$

*Example 22.—The preparation of 3β,17α-diacetoxy-5α-bromo-6β-hydroxy-pregnane-20-one*

To a solution of the steroid produced in Example 21 (51 g.), dioxane (400 cc.), and 0.5 M aq. HClO$_4$ (23 cc.) was added N-bromoacetamide (43.2 g.) in four portions over ½ hr. period. Stirring was continued at room temperature for another ½ hour. The solution was then added to Na$_2$SO$_3$ (75 g.) in water (1250 cc.). Extraction with CH$_2$Cl$_2$ and evaporation resulted in the crystallisation of 28 g. (45%) of the desired bromohydrin. A subsequent crystallisation from CH$_2$Cl$_2$-hexane gave 6.6 g. (10.5%) more.

IR $\nu_{max}^{KBr}$ 3500 s., 1750 vs. 1710 vs., 1700 vs., 1250 vs., cm.$^{-1}$. $\nu_{max}^{CHCl_3}$ 3750–3500 s., 1750 vs., 1740 vs., shoulder, 1260 s., cm.$^{-1}$ $[\alpha]_D^{21.5°}$ —49° (1.12—CHCl$_3$).

Anal. sample: [prisms from CH$_2$Cl$_2$-ether, M.P. 190–196° C.]. C$_{25}$H$_{37}$O$_6$Br requires: C, 58.47; H, 7.26; O, 18.70; Br, 15.56. Found: C, 59.32; H, 7.43; O, 18.31; Br, 15.30. Found: C, 58.75; H, 7.24.

*Example 23.—The preparation of 3β,17α-diacetoxy-5,6β-oxide pregnane-20-one*

The bromohydrin from Example 20 (1 g.) was refluxed with MeOH (260 cc.) and KOAc (15 g.) for two hours. The MeOH was evaporated in vacuo and water was added. The product was filtered and crystallised from CH$_2$Cl$_2$-hexane to give a first crop of 679 mg. (80.6%).

IR $\nu_{max}^{KBr}$ 1740 vs., 1710 vs., 1240 vs., cm.$^{-1}$ $\nu_{max}^{CHCl_3}$ 1740 vs., 1260–1180 s., cm.$^{-1}$ $[\alpha]^{23.5°}$ —20° (1.04—CHCl$_3$).

Anal. sample [needles from CH$_2$Cl$_2$-ether, M.P. 177–179° C.]. C$_{25}$H$_{36}$O$_6$ requires: C, 69.42; H, 8.39; O, 22.19. Found: C, 69.34, H, 8.40; O, 22.30.

*Example 24.—The preparation of 3β,17α-diacetoxy-5α-chloro-6β-hydroxy-pregnane-20-one*

The oxide from Example 23 (9 g.) was treated with 0.3 N CHCl$_3$-HCl (90 cc.) for 1 hour at 0° C. The solution was washed with H$_2$O, NaHCO$_3$, sat. NaCl, and dried. Crystallisation from CH$_2$Cl$_2$-hexane gave in two crops 9.1 g. (92.8%) of pure chlorohydrin.

IR $\nu_{max}^{KBr}$ 3500 s., 1740 vs., 1710 vs., 1700 vs., 1260–40 vs. cm.$^{-1}$ $[\alpha]_D^{27°}$ —47° (0.86—CHCl$_3$).

Anal. sample [prisms from CH$_2$Cl$_2$-ether, M.P. 213–223° C.]. C$_{25}$H$_{37}$O$_6$Cl requires: C, 64.02; H, 7.95; O, 20.47; Cl, 7.56. Found: C, 64.18; H, 7.92; O, 20.21; Cl, 7.87.

*Example 25.—The preparation of 3β,17α-diacetoxy-5α-chloro-6β,19-oxide-pregnane-20-one*

The chlorohydrin from Example 24 (1 g.) was dissolved in CCl$_4$ (100 cc.) and photolyzed for 1 hour with stirring with HgO (1.8 g.) and I$_2$ (2 g.). After filtration to remove the HgO, the solution was washed with Na$_2$S$_2$O$_3$ (10% aq.) and water.

Crystallisation from CH$_2$Cl$_2$-ether gave a first crop of 750 mg. (75.5%) of the ether.

IR $\nu_{max}^{KBr}$ 1740 vs., 1710 vs., 1250 vs. (broad) cm.$^{-1}$ $[\alpha]_D^{28°}$ —6° (0.82—CHCl$_3$).

Anal. sample [small prisms from CH$_2$Cl$_2$-ether, M.P. 183–190° C. recrystallises to needle-prisms, M.P. 208–209.5° C.]. C$_{25}$H$_{35}$O$_6$Cl requires: C, 64.29; H, 7.55; O, 20.56; Cl, 7.59. Found: C, 64,56; H, 7.74; O, 19.90; Cl, 8.10.

*Example 26.—The preparation of 3β-hydroxy-17α-acetoxy-5α-chloro-6β-hydroxy-pregnane (6→19 ether)-20-one*

The product of Example 25 (1.36 g.) was treated with MeOH (100 cc.) and 5% MeOH-KOH (10 cc.) at room temperature for ½ hour. The MeOH was evaporated in vacuo, water was added, and the solid was filtered. Crystallisation from CH$_2$Cl$_2$-hexane gave a first crop of 1.02 g. (82.2%) of the hydrolysed product.

IR $\nu_{max}^{KBr}$ 3650, 3600 s., 1740 vs., 1710 vs., 1250 vs. cm$^{-1}$ $[\alpha]_D^{26°}$ —17° (0.94—CHCl$_3$).

Anal. sample [prisms from CH$_2$Cl$_2$-ether, M.P. 225–255° C.]. C$_{23}$H$_{33}$O$_5$Cl requires: C, 65,00; H, 7.83; O, 18.82; Cl, 8.34. Found: C, 64.86; H, 7.73; O, 18.74; Cl, 9.03.

*Example 27.—The preparation of 3 keto-5α-chloro-6β-hydroxy-17α-acetoxy-pregnane 6→19 ether-20-one*

The crude 3 alcohol prepared by the method of Example 26 from 10 g. acetate in acetone (125 cc.) was treated with an excess of Jones' reagent for 3 min. MeOH and water were added as usual and the solid was filtered. Since this compound is unstable in boiling solvents, the ketone was not purified in this form. Crude wt.—7.1 gms.

IR $\nu_{max}^{KB}$ 1740 s., 1500 w. cm.$^{-1}$

*Example 28.—The preparation of 3-keto-6β-hydroxy-17α-acetoxypregn-4-ene (6→19 ether)-20-one*

Crude oxidation product from Example 27 (500 mg.) was treated at room temperature for 15 min. with MeOH (100 cc.) and 5% MeOH-KOH (5 cc.). After evaporation of MeOH and addition of water, the solid was filtered. Crystallisation from CH$_2$Cl$_2$-hexane gave a first crop of 242 mg. of unsaturated ketone.

Anal. sample (EtOAc-ether) 230–6°. $[\alpha]_D^{28°}$ —117° (0.61—CHCl$_3$).

IR $\lambda_{max}^{MeOH}$ 237 mμ; ε=14,000, $\nu_{max}^{KBr}$ 1740 s., 1720 shoulder, 1665 s., 1495 w. cm.$^{-1}$ C$_{23}$H$_{30}$O$_5$ requires: C, 7.48; H, 7.82; O, 20.70. Found: C, 71.44; H, 8.02; O, 20.46.

*Example 29.—The preparation of $\Delta^4$-19-hydroxy, 17α-acetoxy-pregn-3,20-dione*

A mixture of chloroether and α,β unsaturated ether prepared by the method of Example 28 (3.2 g.) in boiling acetic acid (300 cc.) was treated with zinc (50.4 g.) added in two portions at 7 minute intervals. After 15 min., the solution was filtered and most of the acid was evaporated. Water was added and the solid was filtered. Chromatography yielded 220 mg. of pure 19-ol.

Anal. sample ($CH_2Cl_2$-ether) M.P. (226) 243–245° C. $[\alpha]_D^{25.5°}$ +66° (0.944—$CHCl_3$).

$\lambda_{max.}^{MeOH}$ 241 m$\mu$, $\epsilon$=16,300

$\nu_{max.}^{KBr}$ 3600 m., 3400 ms., 7725 s., 7720 shoulder, 1660s. cm.$^{-1}$ $C_{23}H_{32}O_5$ requires: C, 71.10; H, 8.30; O, 20,59. Found: C, 71.37; H, 8.43; O, 20.38.

A number of other compounds have been prepared by the methods of Examples 21 to 29 and the results are set out in the following table, the intermediate compounds being defined by reference to the following diagram:

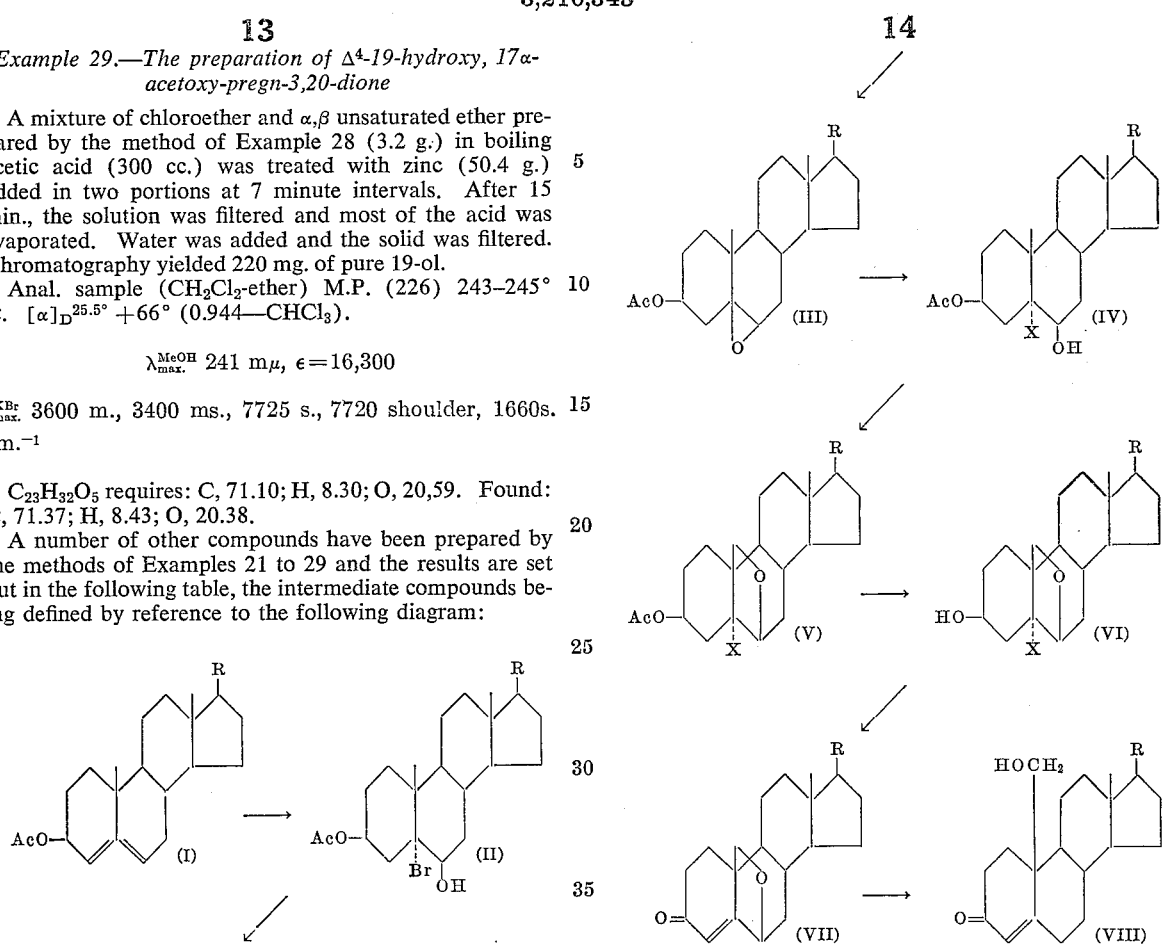

| Compound | II | III | IV | V |
|---|---|---|---|---|
| (a) R=OAc<br>X=Cl | M.P. 168–172°<br>$[\alpha]_D^{27°}$−49°<br>($CHCl_3$—1.09) | M.P. 139–141°<br>$[\alpha]_D^{20°}$−244°<br>($CHCl_3$—1.03) | M.P. 195–200°<br>$[\alpha]_D^{23°}$−40.8°<br>($CHCl_3$—0.809) | M.P. 154–158°<br>$[\alpha]_D^{23°}$−18.4°<br>($CHCl_3$—0.62) |
| (b) R=COCH$_3$<br>X=Cl | M.P. 171–174°<br>$[\alpha]_D^{25.5°}$+7°<br>($CHCl_3$—0.929) | $[\alpha]_D^{27°}$+49.5°<br>($CHCl_3$—1.03) | M.P. 203–210°<br>$[\alpha]_D^{27°}$+21.1°<br>($CHCl_3$—0.64) | M.P. 131–133.5°<br>$[\alpha]_D^{27°}$+64.9°<br>($CHCl_3$—0.60)<br>[Example 19] |
| (c) R=OAc<br>X=Br | | | | M.P. 179–181°<br>$[\alpha]_D^{15°}$−7°<br>($CHCl_3$—0.720)<br>[Example 20] |
| (d) R=COCH$_3$<br>X=Br | | | | M.P. 154–157°<br>$[\alpha]_D^{24}$+56°<br>($CHCl_3$—0.629) |
| (e) R=octyl<br>(cholestan series)<br>X=Cl | | | | |

| Compound | VI | VII | VIII | Systematic Name of VIII |
|---|---|---|---|---|
| (a) R=OAc<br>X=Cl | M.P. 183–6°<br>$[\alpha]_D^{23°}$+5.9°<br>($CHCl_3$—0.85) | M.P. 157–9°<br>$[\alpha]_D^{25°}$−96°<br>($CHCl_3$—1.00) | M.P. 165–170° C.<br>$[\alpha]_D^{21°}$+68.8°<br>($CHCl_3$—0.799) | 19-hydroxy-testosterone-17 acetate. |
| (b) R=COCH$_3$<br>X=Cl | M.P. 191–193°<br>$[\alpha]_D^{27°}$+61.7°<br>($CHCl_3$—0.583) | M.P. 142–5°<br>$[\alpha]_D^{27°}$−22.5°<br>($CHCl_3$—1.74)<br>−24.5°<br>($CHCl_3$—1.00) | M.P. 165–168°<br>$[\alpha]_D^{24.5°}$+171°<br>($CHCl_3$— )<br>+169°<br>($CHCl_3$—0.533) | 19-hydroxy-progesterone. |
| (c) R=OAc<br>X=Br | M.P. 212–215°<br>$[\alpha]_D^{21°}$−13.7°<br>($CHCl_3$—0.62) | | M.P. 165–170°<br>$[\alpha]_D^{21°}$+68.8°<br>($CHCl_3$—0.799) | 19-hydroxy-testosterone acetate. |
| (d) R=COCH$_3$<br>X=Br | | | | |
| (e) R=octyl<br>(cholestan series)<br>X=Cl | M.P. 147–8° (MeOH)<br>$\nu$max. 1,720 cm.$^{-1}$ | | 145–6° (hexane)<br>$\nu$max. 1,620 cm.$^{-1}$<br>1,670 cm.$^{-1}$<br>3,500 cm.$^{-1}$<br>(19 tosyl derivative)<br>M.P. 146°<br>$[\alpha]_D^{27°}$+90°<br>(C=0.10 $CHCl_3$) | 19-hydroxy-cholest-4en-3-one. |

| Compound | Yield | Formula | Calc'd/Found |
|---|---|---|---|
| IIa | 1.5 g. (2.0 g.) | $C_{23}H_{35}O_5Br$ | C, 58.60; H, 7.50; Br, 16.95.<br>C, 58.80; H, 7.25; Br, 16.25. |
| IIb | 10.4 g. (10 g.) | $C_{23}H_{35}O_4Br$ | C, 60.66; H, 7.75; O, 14.05; Br, 17.55.<br>C, 60.82; H, 7.82; O, 14.21; Br, 17.55. |
| IIIa | 6.7 g. (10 g.) | $C_{23}H_{34}O_5$ | C, 70.74; H, 8.76; O, 20.49.<br>C, 71.01; H, 8.56; O, 20.35. |
| IIIb | 6.5 g. (10 g.) | $C_{23}H_{34}O_4$ | C, 73.76; H, 9.15; O, 17.09.<br>C, 74.06; H, 8.97; O, 16.73. |
| IVa | 5.0 g. (6 g.) | $C_{23}H_{35}O_5Cl$ | C, 64.69; H, 8.26; O, 18.74; Cl, 8.31.<br>C, 64.48; H, 8.18; O, 18.54; Cl, 8.30. |
| IVb | 5.1 g. (6 g.) | $C_{23}H_{35}O_4Cl$ | C, 67.21; H, 8.58; Cl, 8.63.<br>C, 67.05; H, 8.39; Cl, 8.86. |
| Va | 1.5 g. (1 g.) | $C_{23}H_{33}O_5Cl$ | C, 65.00; H, 7.83; O, 18.83; Cl, 8.34.<br>C, 64.85; H, 7.91; O, 18.59; Cl, 8.31. |
| Vb | 750 mg. (1 g.) | $C_{23}H_{33}O_4Cl$ | C, 67.54; H, 8.13; O, 15.65; Cl, 8.67.<br>C, 67.38; H, 8.22; O, 15.44; Cl, 8.43. |
| VIa | 680 mg. (1.1 g.) | $C_{21}H_{31}O_4Cl$ | C, 65.86; H, 8.16; O, 16.71; Cl, 9.26.<br>C, 65.79; H, 8.09; O, 17.00; Cl, 9.27. |
| VIb | 420 mg. (750 mg.) | $C_{21}H_{31}O_3Cl$ | C, 68.74; H, 8.52; Cl, 9.66; O, 13.08.<br>C, 68.67; H, 8.45; Cl, 9.65; O, 13.28. |
| VIIa | 325 mg. (500 mg.) | $C_{21}H_{28}O_4$ | C, 73.22; H, 8.19; O, 18.58.<br>C, 73.34; H, 8.18; O, 18.62. |
| VIIb | 62 mg. (100 mg.) | $C_{21}H_{28}O_3$ | C, 76.79; H, 8.59; O, 14.61.<br>C, 76.97; H, 8.61; O, 14.24. |
| VIIIa | 45 mg. (100 mg.) | $C_{21}H_{30}O_4$ | C, 72.80; H, 8.73; O, 18.47.<br>C, 73.09; H, 8.73; O, 18.41. |
| VIIIb | 50 mg. (100 mg.) | $C_{21}H_{30}O_3$ | C, 76.32; H, 9.15; O, 14.53.<br>C, 76.56; H, 8.98; O, 14.81. |

We claim:

1. A process for the production of 4,5-dehydro-3-oxo-19-nor-steroids comprising reducing a lactone of a 4,5-dehydro - 10 - carboxy - 6β - hydroxy - 3 - oxo - steroid selected from the group consisting of the androstane, cholestane and pregnane series with a reducing system selected from the group consisting of a dissolving metal in acid selected from the group consisting of zinc, copper-zinc couple, tin, aluminum and amalgam and low-valency metal ion reducing systems selected from the group consisting of titanous, chromous and stannous salts, whereby the substitution at the 6- and 10-positions is removed.

2. A process as claimed in claim 1 in which the starting compound is Δ⁴-6β-hydroxy-androsten-3,17-dione-19-oic lactone.

3. A process as claimed in claim 1 comprising the additional step of eliminating HX from a steroid of the formula

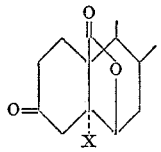

where X is selected from the group consisting of halogen, hydroxyl and hydrocarbon substituted sulphonyloxy to prepare said lactone of said 4,5-dehydro-10-carboxy-6β-hydroxy-3-oxo-steroid.

4. A process as claimed in claim 3 where X is selected from the group consisting of halogen and hydrocarbon substituted sulphonyloxy and the elimination is acid catalyzed.

5. A process as claimed in claim 3 where X is hydroxy and the elimination is effected in the presence of a dehydrating agent.

6. A process as claimed in claim 3 where the elimination of HX is effected simultaneously with the reduction of the lactone.

7. A process as claimed in claim 3 in which the starting compound of the formula given in claim 3 is prepared by replacement of the group R of a compound of the formula

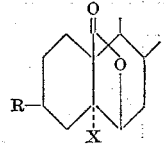

where R is selected from the class consisting of acyloxy ketal and thioketal groups and X is previously defined by a ketone oxygen atom.

8. A process as claimed in claim 7 in which the compound of the formula given in claim 7 is prepared by oxidation of a hemiacetal of the formula

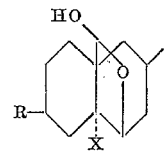

where R and X have the meanings given in claim 7 with chromium trioxide.

9. A process as claimed in claim 8 in which the hemiacetal of the formula given in claim 8 is prepared by reacting an oxime of the formula

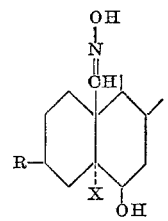

with a mineral acid.

10. A process as claimed in claim 9 in which the oxime of the formula given in claim 9 is prepared by photolysis of a nitrite ester of the formula

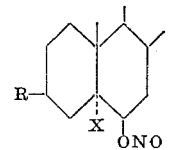

where R and X have the meanings given in claim 7 to give a dimeric nitroso derivative which is isomerized to give the desired oxime.

11. A process as claimed in claim 10 in which the photolysis is effected with a high pressure mercury arc lamp emitting ultra-violet radiation in the range 3000–4400 A.

12. A process as claimed in claim 10 in which the initial nitroso dimer is isomerized by heating in an inert solvent.

13. A process as claimed in claim 10 in which the said nitrite ester is prepared by reacting an alcohol of the formula

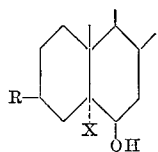

where R and X have the meanings given in claim 7 with a nitrosyl halide.

14. A process as claimed in claim 13 in which the alcohol of the formula given in claim 13 is prepared by reacting an unsaturated steroid of the formula

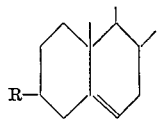

where R has the meaning given in claim 7 with a hypohalous acid.

15. $\Delta^4$ - 6$\beta$ - hydroxy - androsten - 3,17 - dione - 19-oic lactone.

16. A compound selected from the group consisting of a lactone of a 4,5-dehydro-10-carboxy-6$\beta$-hydroxy-3-oxosteriod having at the 17-position a side chain selected from the group consisting of those characterizing pregnane, androstane and cholestane compounds.

References Cited by the Examiner
UNITED STATES PATENTS

| | | | |
|---|---|---|---|
| 3,001,989 | 9/61 | Ringold et al. | 260—239.55 |
| 3,014,931 | 12/61 | Nishikawa et al. | 260—397.1 |
| 3,067,198 | 12/62 | Wettstein et al. | 260—239.55 |
| 3,141,016 | 7/64 | Wettstein et al. | 260—239.55 |

OTHER REFERENCES

Sondheimer et al., Tetrahedron Letters No. 22 (1960) page 38 relied on.

LEWIS GOTTS, *Primary Examiner.*